United States Patent [19]

Takahashi et al.

[11] Patent Number: 5,132,059
[45] Date of Patent: Jul. 21, 1992

[54] PROCESS FOR PRODUCING A POLYVINYL FORMAL ULTRAFILTRATION MEMBRANE

[75] Inventors: Yosuke Takahashi; Toru Seita, both of Atsugi, Japan

[73] Assignee: Tosoh Corporation, Shinnanyo, Japan

[21] Appl. No.: 291,122

[22] Filed: Dec. 28, 1988

[30] Foreign Application Priority Data

Dec. 28, 1987 [JP] Japan .................. 62-334905
Mar. 10, 1988 [JP] Japan .................. 63-54865
Mar. 10, 1988 [JP] Japan .................. 63-54866
Jun. 20, 1988 [JP] Japan .................. 63-150202

[51] Int. Cl.$^5$ .................................................. B29C 65/00
[52] U.S. Cl. .................................. 264/41; 210/500.36; 210/500.42; 264/185; 264/209.1; 525/61
[58] Field of Search .............. 525/61; 210/500.36, 210/500.42; 264/41, 185, 209.1

[56] References Cited

U.S. PATENT DOCUMENTS 3,963,618  6/1976  Muir ........................ 210/500
3,988,245 10/1976  Wang ....................... 210/500

*Primary Examiner*—Joseph L. Schofer
*Assistant Examiner*—J. M. Reddick
*Attorney, Agent, or Firm*—Foley & Lardner

[57] ABSTRACT

An ultrafiltration membrane formed of a polyvinyl formal resin having a recurring unit represented by the general formula (I), and a process for producing this ultrafiltration membrane:

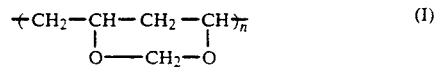

wherein n is 550 to 950.

8 Claims, No Drawings

PROCESS FOR PRODUCING A POLYVINYL FORMAL ULTRAFILTRATION MEMBRANE

FIELD OF THE INVENTION

The present invention relates to a hydrophilic ultrafiltration membrane made of a polyvinyl formal resin and a process for producing such a membrane.

BACKGROUND OF THE INVENTION

It has been known that ultrafiltration membranes can be produced by wet processes from a variety of resins including polysulfone, polyether sulfone, acetyl cellulose, cellulose, etc. However, ultrafiltration membranes obtained from hydrophobic resins such as polysulfone and polyether sulfone suffer problems originating from their hydrophobicity; that is, when they are used to treat highly hydrophobic aqueous solutions such as hydrophobic aqueous protein solutions, oil emulsions, milk, citrous fruit juice, blood plasma and serum, since such feeds are adsorbed on the membrane surface not only is the membrane fouled but also the quantity of permeating water is decreased with time. Membranes made of cellulose are highly hyrophilic and free from the problems encountered in the hydrophobic membranes, but they have a disadvantage of low resistance to acids and alkalis. Furthermore, it has been pointed out that cellulose is very low in resistance to bacterial degradation.

Membranes made of polyvinyl alcohol-based resins have also been known [see, for example, JP-A-49-53955 and JP-A-52-123385 (the term "JP-A" as used hereinafter means an "unexamined published Japanese patent application")]. In order to enable membrane formation from polyvinyl alcohol which is a water-soluble polymer and to impart water resistance to the membrane, the proposed methods comprise adding an acetalizing agent (e.g., formaldehyde or a dialdehyde such as glutaraldehyde) and a crosslinking agent to an aqueous solution of polyvinyl alcohol and heating the resulting water-soluble polymeric aqueous solution so as to allow the acetalizing reaction of polyvinyl alcohol to proceed for membrane formation.

Disadvantages of ultrafiltration membranes in common use today which are made of polysulfone or cellulose based resins are summarized as follows:

(1) polysulfone membranes very likely adsorb hydrophobic feeds; and
(2) cellulose membranes have very low resistance to bacterial degradation.

Since the conventional processes of forming ultrafiltration membranes from polyvinyl alcohol-based resins are carried out in an aqueous system and rely upon homogeneous reaction in an aqueous solution, a pore forming agent must be added in order to convert the resin into a substantially porous body such as an ultrafiltration membrane. Furthermore, temperature control for ensuring uniform acetalization is difficult to achieve and the reactivity by the scale of the membrane is not uniform.

SUMMARY OF THE INVENTION

With a view to solving the aforementioned problems of the prior art and obtaining an ultra-filtration membrane that is less prone to adsorption of hydrophobic feeds and which has resistance to bacterial degradation, the present inventors have conducted intensive studies and found that the desired ultrafiltration membrane can be produced without employing a pore forming agent or other additives when a wet process is applied to a hydrophilic polyvinyl formal resin having a recurring unit represented by the general formula (I):

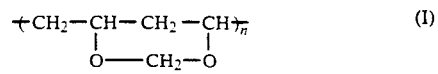

wherein n is from 550 to 950.

In other words, the ultrafiltration membrane of the present invention is characterized by being made of a polyvinyl formal resin whose degree of polymerization is in the range of 550 to 950.

The process for producing this ultrafiltration membrane is characterized by obtaining it through a wet method.

DETAILED DESCRIPTION OF THE INVENTION

An outline of the process for producing the ultrafiltration membrane of the present invention is described hereinafter.

The membrane is produced from a polyvinyl formal resin which is derived from polyvinyl alcohol. Polyvinyl alcohol is a saponification product of a vinyl acetate homopolymer and its degree of saponification is at least 70%, preferably at least 80%.

By allowing formaldehyde to react with the polyvinyl alcohol in accordance with the customary procedures, a polyvinyl formal resin is obtained that has undergone intramolecular formalization. The degree of polymerization of this polyvinyl formal resin should be in the range of 550 to 950 in view of the viscosity of the resin when doped and the stability of the finally obtained membrane. Membranes produced from polyvinyl formal resins whose degree of polymerization is less than 550 fail in stability. Those having a polymerization degree higher than 950 become highly viscous when doped and their viscosity fluctuates greatly with temperature.

The present invention can produce ultrafiltration membrane of various fractional molecular weights in accordance with a specific object; on the higher side, the fractional molecular weight is in the range of $1 \times 10^6$ to $3 \times 10^6$, and on the lower side, it is not larger than $1 \times 10^5$.

Polyvinyl formal resins whose degree of polymerization is within the range of from 550 to 950 and which are suitable for the purpose of membrane formation are processed into a dope by dissolving in suitable media which are selected from among water-miscible polar solvents. A particularly preferred solvent is N-methyl-2-pyrrolidone. A mixture of N-methyl-2-pyrrolidone and acetone is also usable and the weight ratio of N-methyl-2-pyrrolidone to acetone is preferably in the range of from 7:3 to 8:2.

In order to make dopes for producing ultrafiltration membranes having a high fractional molecular weight in the range of $1 \times 10^6$ to $3 \times 10^6$, water-miscible polar solvents can also be used as media, and a particularly preferred solvent is N,N-dimethylformamide which is a polar solvent that diffuses in water very rapidly.

Water-miscible polar solvents may also be used as media for preparing ultrafiltration membranes having a fractional molecular weight not larger than $1 \times 10^5$, and particularly preferred solvents are mixtures of 1,4-dioxane, tetrahydrofuran or 1,3-dioxolane which is polar solvents having oxygen atoms in the molecule and which diffuses in water slowly, with N-methyl-2-pyrrolidone or N,N-dimethylformamide which is moderately fast to diffuse in water, in a mixing ratio of the first to the second solvent in the range of from 1:9 to 9:1 on a weight basis. If solvents that slowly diffuse in water are used only, the resulting membrane does not have a uniform specular surface, but a desired homogeneous membrane can be obtained by employing the abovedescribed two types of solvents in admixture. It is also possible to employ mixed solvents that additionally contain rapidly evaporating acetone in an amount of from 1 to 20% of the total weight of the mixed solvent. In this case, fractional molecular weights can be adjusted by controlling the time of solvent evaporation.

As already stressed, the present invention requires that polyvinyl formal resins whose degree of polymerization is within the range of 550 to 950 be used as the starting material for the preparation of an ultrafiltration membrane. If polyvinyl formal resins having a low degree of polymerization are used, the resulting ultrafiltration membrane has lower strength but on the other hand, its fractional molecular weight can be reduced to a lower value, say, $1 \times 10^5$ and below. In order to take advantage of this feature of polyvinyl formal resins having a low degree of polymerization, they may be blended with polyvinyl formal resins having a high degree of polymerization in the range suitable for membrane formation, and using this blend, an ultrafiltration membrane having adequate strength can be produced in which the resin having a high degree of polymerization is used as a matrix. Desirably, the two kinds of polyvinyl formal resins have degrees of polymerization in the respective ranges of from 550 to 650 and from 700 to 800. The ratio of the first type of resin (having a low degree of polymerization) to the second type (having a high degree of polymerization) which are to be blended is preferably in the range of from 10:90 to 85:15 on a weight basis.

When the starting resin is composed of two kinds of polyvinyl formal resins having different degrees of polymerization as described above, their dopes can be prepared using water-miscible polar solvents. Particularly preferred solvents are those which are moderately fast to diffuse in water such as N-methyl-2-pyrrolidone and N,N-dimethylformamide, which may be used either singly or in admixture with polar solvents that have oxygen atoms in the molecule and which slowly diffuse into water, such as 1,4-dioxane, tetrahydrofuran and 1,3-dioxolane, in a mixing ratio in the range of from 1:9 to 9:1 on a weight basis.

Alternatively, such a mixed solvent may additionally contain rapidly evaporating acetone in an amount of 1 to 20% of the total weight of the solvent system.

The polyvinyl formal resin is dissolved in one or more of the solvents described above to prepare a membrane-forming dope, whose polymer concentration is preferably in the range of 8 to 20 wt. %. If the polymer concentration of the dope is less than 8 wt. %, its viscosity is too low to ensure consistent production of high-performance membranes. If the polymer concentration of the dope is higher than 20 wt. %, it is too viscous to be suitable for membrane formation An ultrafiltration membrane is formed by performing a wet process (phase inversion) on the dope prepared under the conditions described above The wet process as employed in the present invention is a method in which the dope-gelling atmosphere is maintained in a wet state (in liquid phase), or a method in which the solvent in the dope is transferred into the liquid phase of a coagulation bath so as to gel the dope.

The coagulation bath is preferably composed of water that is held at a temperature in the range of 0° to 45° C. If the temperature of water is lower than 0° C., phase inversion (gelation) of the dope proceeds too slowly, and if it is above 45° C., the gelling dope shrinks and fails to produce membranes of consistent performance.

The polyvinyl formal ultrafiltration membrane produced by the process described above is so highly hydrophilic that it is very low in adsorption of hydrophobic substances but also exhibits high resistance to bacterial degradation. Therefore, this membrane is suitable for use in various processes of manufacturing pharmaceuticals and foodstuffs, and in the treatments of wastewaters. More specific examples of its application include: desalting, fractionation and concentration of aqueous protein solutions, fractionation of blood plasma, filtration and purification of vaccines, etc., removal of pyrogens, filtration and purification of oil emulsions, and concentration of milk and citrus fruit juice, as well as removal of COD from wastewaters and treatment of activated sludge.

The membrane of the present invention has the added advantage of retaining its performance as an ultrafiltration membrane even after it is dried, so it can be handled in a dry state.

The following Examples and Comparative Examples are provided for the purpose of further illustrating the present invention but are in no way to be taken as limiting the ultrafiltration membrane, or process for producing it, of the present invention.

EXAMPLE 1

Polyvinyl formal resin (80% conversion to formal; average degree of polymerization, 750) was processed into a dope of 15 wt. % concentration using N-methyl-2-pyrrolidone as a solvent. This dope was coated uniformly on a nonwoven polyester fabric, which was then introduced into a coagulation bath filled with pure water at 25° C. for making a membrane by a wet process. The resulting membrane in flat sheet form had a separating layer in a thickness of 220 μm and was capable of allowing pure water to permeate at a rate of 2,000 $l/m^2 \cdot hr \cdot kgf/cm^2$. This membrane was found to have a fractional molecular weight of 300,000 when measured in terms of the percent exclusion of globular proteins. The membrane formed a contact angle of about 50° with respect to pure water right after a drop of water was deposited, but in about one minute the drop spread to completely wet the membrane. This indicates that the resulting membrane was highly hydrophilic.

EXAMPLE 2

Polyvinyl formal resin (80% conversion to formal; average degree of polymerization, 750) was processed into a dope of 15 wt. % concentration using an 8:2 mixture of N-methyl-2-pyrrolidone and acetone as a solvent. A membrane was formed from this dope by the same procedures as those employed in Example 1. The resulting flat membrane had a separating layer in a thickness of 220 μm and was capable of allowing pure water to permeate at a rate of 1,200 $l/m^2 \cdot hr \cdot kgf/cm^2$. This membrane was found to have a fractional molecular weight of 100,000 when measured in terms of the percent exclusion of globular proteins. A drop of pure water deposited on this membrane spread to wet it completely within one minute.

COMPARATIVE EXAMPLE 1

Polyvinyl formal resin (80% conversion to formal) having an average degree of polymerization of 500 was processed into a dope of 15 wt. % concentration using N-methyl-2-pyrrolidone as a solvent. An attempt was made to form an ultrafiltration membrane from this dope as in Example 1 but as it turned out, a desired membrane could not be obtained consistently from said polyvinyl formal resin.

COMPARATIVE EXAMPLE 2

Polyvinyl formal resin (80% conversion to formal) having an average degree of polymerization of 970 was processed into a dope of 15 wt. % concentration using N-methyl-2-pyrrolidone as a solvent. An attempt was made to form a membrane from this dope as in Example 1 but this was not possible on account of the excessive viscosity of the dope.

COMPARATIVE EXAMPLE 3

A 15 wt. % aqueous solution of polyvinyl alcohol having an average degree of polymerization of 750 and a degree of saponification of 90% was mixed uniformly with 6 wt. % of a corn flour as a pore forming agent, and the mixture was heated at 80° C. To the heated mixture, a 40% aqueous solution of formaldehyde and 50% sulfuric acid (catalyst) were added in respective amounts of 15 wt. % and 12 wt. % of the total weight, and the mixture was held at 80° C. to make a stock solution for membrane formation. This stock solution was introduced into a coagulation bath (30 wt. % aqueous solution of NaOH) and shaped into a membrane by the same method as that employed in Example 1. By subsequent neutralization and washing with water, a polyvinyl formal ultrafiltration membrane was obtained. However, this process involved greater difficulty than Examples 1 and 2 and the results obtained were not at all reproducible.

EXAMPLE 3

Polyvinyl formal resin (80% conversion to formal; average degree of polymerization, 750) was processed into a dope of 8 wt. % concentration using N,N-dimethylformamide as a solvent. This dope was coated uniformly on a nonwoven polyester fabric, which was then introduced into a coagulation bath filled with pure water at 45° C. for making a membrane by a wet process. The resulting membrane in flat sheet form had a separating layer in a thickness of 200 μm and was capable of allowing pure water to permeate at a rate of 3,800 l/m$^2$·hr·kgf/cm$^2$. This membrane was found to have a fractional molecular weight of 3,000,000 when measured in terms of the percent exclusion of globular proteins. The membrane formed a contact angle of about 50° with respect to pure water right after a drop of water was deposited, but in about one minute the drop spread to completely wet the membrane. This indicates that the resulting membrane was highly hydrophilic.

EXAMPLE 4

Polyvinyl formal resin (80% conversion to formal; average degree of polymerization, 750) was processed into a dope of 10 wt. % concentration using N,N-dimethylformamide as a solvent. A membrane was formed from this dope by the same procedures as those employed in Example 3 except that the temperature of the coagulation bath was held at 30° C. The resulting membrane in flat sheet form had a separating layer in a thickness of 210 μm and was capable of allowing pure water to permeate at a rate of 1,600 l/m$^2$·hr·kgf/cm$^2$. This membrane was found to have a fractional molecular weight of 1,000,000 when measured in terms of the percent exclusion of globular proteins. A drop of pure water deposited on this membrane spread to wet it completly within one minute.

COMPARATIVE EXAMPLE 4

Polyvinyl formal resin (80% conversion to formal) having an average degree of polymerization of 500 was processed into a dope of 8 wt. % concentration using N,N-dimethylformamide as a solvent. An attempt was made to form an ultrafiltration membrane from this dope as in Example 3 but as it turned out, a desired membrane of uniform thickness could not be formed from said polyvinyl formal resin.

COMPARATIVE EXAMPLE 5

Polyvinyl formal resin (80% conversion to formal) having an average degree of polymerization of 1,000 was processed into a dope of 10 wt. % concentration using N,N-dimethylformamide as a solvent. An attempt was made to form membrane from this dope as in Example 4 but this was not possible on account of the excessive viscosity of the dope.

COMPARATIVE EXAMPLE 6

A 10 wt. % aqueous solution of polyvinyl alcohol having an average degree of polymerization of 750 and a degree of saponification of 90% was mixed uniformly with 6 wt. % of a corn flour as a pore forming agent, and the mixture was heated at 80° C. To the heated mixture, a 40% aqueous solution of formaldehyde and 50% sulfuric acid (catalyst) were added in respective amounts of 15 wt. % and 12 wt. % of the total weight, and the mixture was held at 80° C to make a stock solution for membrane formation. This stock solution was introduced into a coagulation bath (30 wt. % aqueous solution of NaOH) and shaped into a membrane by the same method as that employed in Example 3. By subsequent neutralization and washing with water, a polyvinyl formal ultrafiltration membrane was obtained However, this process involved greater difficulty than Examples 3 and 4 and the results obtained were not at all reproducible.

EXAMPLE 5

Polyvinyl formal resin (80% conversion to formal; average degree of polymerization, 750) was processed into a dope of 15 wt. % concentration using a mixture of 1,4-dioxane and N,N-dimethylformamide (7:3 in weight ratio) as a solvent. This dope was coated uniformly on a nonwoven polyester fabric, which was then introduced into a coagulation bath filled with pure water at 5° C. for making a membrane by a wet process. The resulting membrane in , flat sheet form had a separating layer in a thickness of 220 μm and was capable of allowing pure water to permeate at a rate of 550 l/m$^2$·hr·kgf/cm$^2$. This membrane was found to have a fractional molecular weight of 50,000 when measured in terms of the percent exclusion of globular proteins. The membrane formed a contact angle of about 50° with respect to pure water right after a drop of water was deposited, but in about one minute the drop spread to completely wet the membrane, indicating that the resulting membrane was highly hydrophilic. This membrane retained its performance even after being dried and, therefore, had an advantage of permitting handling in a dry state.

EXAMPLE 6

Polyvinyl formal resin (80% conversion to formal; average degree of polymerization, 750) was processed into a dope of 17 wt. % concentration using a mixture of 1,4-dioxane and N,N-dimethylformamide (7:3 in weight ratio) as a solvent to which was added acetone in an amount of 10 wt. % of the total solvent A membrane was formed from this dope by the same procedures as those employed in Example 5 except that the temperature of water was held at 5° C. The resulting membrane in flat sheet form had a separating layer in a thickness of 220 μm and was capable of allowing pure water to permeate at a rate of 300 l/m$^2$·hr·kgf/cm$^2$. This membrane was found to have a fractional molecular weight of 30,000 when measured in terms of the percent exclusion of globular proteins A drop of pure water deposited on this membrane spread to wet it completely within one minute.

COMPARATIVE EXAMPLE 7

Polyvinyl formal resin (80% conversion to formal) having an average degree of polymerization of 970 was processed into a dope of 17 wt. % concentration using a mixture of 1,4-dioxane and N,N-dimethylformamide (7:3 in weight ratio) as a solvent. An attempt was made to form a membrane from this dope as in Example 5 but this was not possible on account of the excessive viscosity of the dope.

EXAMPLE 7

A dope was prepared by dissolving 15 wt. % of polyvinyl formal resin (80% conversion to formal; average degree of polymerization, 550) and 10 wt. % of polyvinyl formal resin (80% conversion to formal; average degree of polymerization, 750) in solvent N-methyl-2-pyrrolidone. This dope was then coated uniformly on a nonwoven polyester fabric, which was introduced into a coagulation bath filled with pure water at 5° C. for making a membrane by a wet process. The resulting membrane in flat sheet form had a separating layer in a thickness of 230 μm and was capable of allowing pure water to permeate at a rate of 400 l/m$^2$·hr·kgf/cm$^2$. This membrane was found to have a fractional molecular weight of 30,000 when measured in terms of the percent exclusion of globular proteins. The membrane formed a contact angle of about 50° with respect to pure water right after a drop of water was deposited, but in about one minute the drop spread to completely wet the membrane. This indicates that the resulting membrane was highly hydrophilic.

EXAMPLE 8

A dope was prepared by dissolving 15 wt. % of polyvinyl formal resin (80% conversion to formal; average degree of polymerization, 550) and 10 wt. % of polyvinyl formal resin (80% conversion to formal; average degree of polymerization, 750) in a mixed solvent of 1,4-dioxane and N,N-dimethylformamide (7:3 in weight ratio). A membrane was formed from this dope by the same procedures as those employed in Example 7 except that the temperature of water was held at 5° C. The resulting membrane in flat sheet form had a separating layer in a thickness of 230 μm and was capable of allowing pure water to permeate at a rate of 100 l/m$^2$·hr·kgf/cm$^2$. This membrane was found to have a fractional molecular weight of 10,000 when measured in terms of the percent exclusion of globular proteins. A drop of pure water was deposited on this membrane spread to wet it completely within one minute.

While the invention has been described in detail and with reference to specific embodiments thereof, it will be apparent to one skilled in the art that various changes and modifications can be made therein without departing from the spirit and scope thereof.

What is claimed is:

1. A process for producing an ultrafiltration membrane having a fractional molecular weight of $1 \times 10^6$ to $3 \times 10^6$, comprising the steps of
   a) dissolving a polyvinyl formal resin having a recurring unit represented by the general formula I,

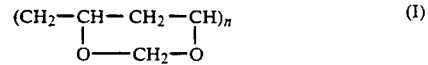

wherein n is 550 to 950, in a solvent selected from the group consisting of N-methyl-2-pyrrolidone, a mixture of N-methyl-2-pyrrolidone and acetone, and N,N'-dimethylformamide, to form a dope, and
   b) forming said dope into a membrane by a wet method.

2. A process according to claim 1, wherein said wet method employs a coagulation bath comprised of water having a temperature of 0° to 45° C.

3. A process according to claim 1, wherein said dope has a polymer concentration of 8 to 20 wt. %.

4. A process for producing an ultrafiltration membrane, comprising
   dissolving a polyvinyl formal resin having a fractional molecular weight of no higher than $1 \times 10^5$ and a recurring unit represented by the general formula (I):

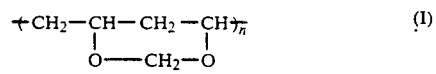

wherein n is from 550 to 950, in a mixed solvent comprising a first component selected from the group consisting of 1,4-dioxane, tetrahydrofuran and 1,3-dioxolane and a second component selected from the group consisting of N-methyl-2-pyrrolidone and N,N-dimethylformamide, to form a dope, wherein the weight ratio of said first component to said second component ranges from 1:9 to 9:1, and
   forming the resulting dope into a membrane by a wet method.

5. A process according to claim 4, wherein said mixed solvent further comprises acetone in an amount of 1 to 20% of the total weight of the solvent system.

6. A process according to claim 4, wherein said wet method employs a coagulation bath comprised of water having a temperature of 0° to 45° C.

7. A process according to claim 4, wherein said dope has a polymer concentration of 8 to 20 wt. %.

8. A process according to claim 3, wherein said solvent is selected from the group consisting of N-methyl-2-pyrrolidone, a mixture of N-methyl-2-pyrrolidone and acetoane, and N,N-dimethylformamide.

* * * * *